(12) United States Patent
Schulze (10) Patent No.: US 7,200,455 B2
(45) Date of Patent: Apr. 3, 2007

(54) METHOD OF PROCESS CONTROL

(75) Inventor: Uwe Schulze, Dresden (DE)

(73) Assignee: Advanced Micro Devices, Inc., Austin, TX (US)

( * ) Notice: Subject to any disclaimer, the term of this patent is extended or adjusted under 35 U.S.C. 154(b) by 0 days.

(21) Appl. No.: 11/214,115

(22) Filed: Aug. 29, 2005

(65) Prior Publication Data

US 2006/0195211 A1 Aug. 31, 2006

(30) Foreign Application Priority Data

Feb. 28, 2005 (DE) ...................... 10 2005 009 071

(51) Int. Cl.
*G06F 19/00* (2006.01)
*H01L 21/00* (2006.01)
*G06K 9/00* (2006.01)

(52) U.S. Cl. ...................... 700/109; 700/110; 700/121; 702/84; 438/7; 382/145

(58) Field of Classification Search ................... 700/9, 700/28–33, 41–45, 47–49, 51, 54, 71, 108–110, 700/120, 121; 702/84; 438/5, 7, 14, 16; 356/625; 382/141, 145, 147, 151
See application file for complete search history.

(56) References Cited

U.S. PATENT DOCUMENTS 5,526,293 A * 6/1996 Mozumder et al. ............ 716/19
5,926,690 A * 7/1999 Toprac et al. .................. 438/17
5,976,740 A * 11/1999 Ausschnitt et al. ............ 430/30
6,625,512 B1 * 9/2003 Goodwin ..................... 700/121
2002/0191165 A1 * 12/2002 Baselmans et al. ........... 355/52
2003/0058428 A1 * 3/2003 Jun et al. ...................... 355/77

* cited by examiner

*Primary Examiner*—Albert W. Paladini
*Assistant Examiner*—Sean Shechtman
(74) *Attorney, Agent, or Firm*—Williams, Morgan & Amerson, P.C.

(57) ABSTRACT

The present invention relates to a method of run-to-run control of a manufacturing process. A plurality of runs of the manufacturing process is performed. In each of the runs, a value of a process input is applied to the manufacturing process. A measured value of a process output of the respective run is determined. A process input quantity is calculated based on the measured value, the applied process input, a target value of the process output and at least one value of a sensitivity parameter. The sensitivity parameter describes a variation of the process output caused by a variation of the process input. The process input applied in a subsequent one of the plurality of runs is based on the process input quantity. The sensitivity parameter is modified between at least one pair of the runs of the manufacturing process. The method of run-to-run control may be applied in order to control a critical dimension of regions of a photoresist layer remaining on a surface of a semiconductor structure after development of the photoresist layer.

16 Claims, 4 Drawing Sheets

METHOD OF PROCESS CONTROL

BACKGROUND OF THE INVENTION

1. Field of the Invention

The present invention relates to the formation of integrated circuits, and, more particularly, to the control of processes used in the formation of integrated circuits.

2. Description of the Related Art

Integrated circuits comprise a large number of individual circuit elements, such as transistors, capacitors and resistors, formed on a substrate. These elements are connected internally by means of electrically conductive lines to form complex circuits, such as memory devices, logic devices and microprocessors. The performance of integrated circuits can be improved by increasing the number of functional elements per circuit in order to increase their functionality and/or by increasing the speed of operation of the circuit elements. A reduction of feature sizes allows the formation of a greater number of circuit elements on the same area, hence allowing an extension of the functionality of the circuit and also reducing signal propagation delays. Thus, an increase of the speed of operation of circuit elements is made possible. In modem integrated circuits, design rules of about 90 nm or less can be applied.

Field effect transistors are used as switching elements in integrated circuits. They allow control of a current flowing through a channel region located between a source region and a drain region. The source region and the drain region are highly doped. The conductivity of the channel region is controlled by a gate voltage applied to a gate electrode formed above the channel region and separated therefrom by a thin insulating layer. Depending on the gate voltage, the channel region may be switched between a conductive "on" state and a substantially non-conductive "off" state.

When reducing the size of field effect transistors, it is important to maintain a high conductivity of the channel region in the "on" state. The conductivity of the channel region in the "on" state depends on the dopant concentration in the channel region, the mobility of the charge carriers, the extension of the channel region in the width direction of the transistor and the distance between the source region and the drain region, which is commonly denoted as "channel length." While a reduction of the width of the channel region leads to a decrease of the channel conductivity, a reduction of the channel length enhances the channel conductivity. An increase of the charge carrier mobility leads to an increase of the channel conductivity.

As feature sizes are reduced, the extension of the channel region in the width direction is also reduced. A reduction of the channel length may at least partially compensate for the corresponding reduction of the channel conductivity. Reducing the channel length, however, entails a plurality of issues associated therewith. First, highly sophisticated dopant profiles, in the vertical direction as well as in the lateral direction, are required in the source region and in the drain region in order to provide a low sheet resistivity and a low contact resistivity in combination with a desired channel controllability. Second, a reduction of the channel length entails a corresponding reduction of the dimension of the gate electrode in the length direction of the field effect transistor.

Figure 1A:
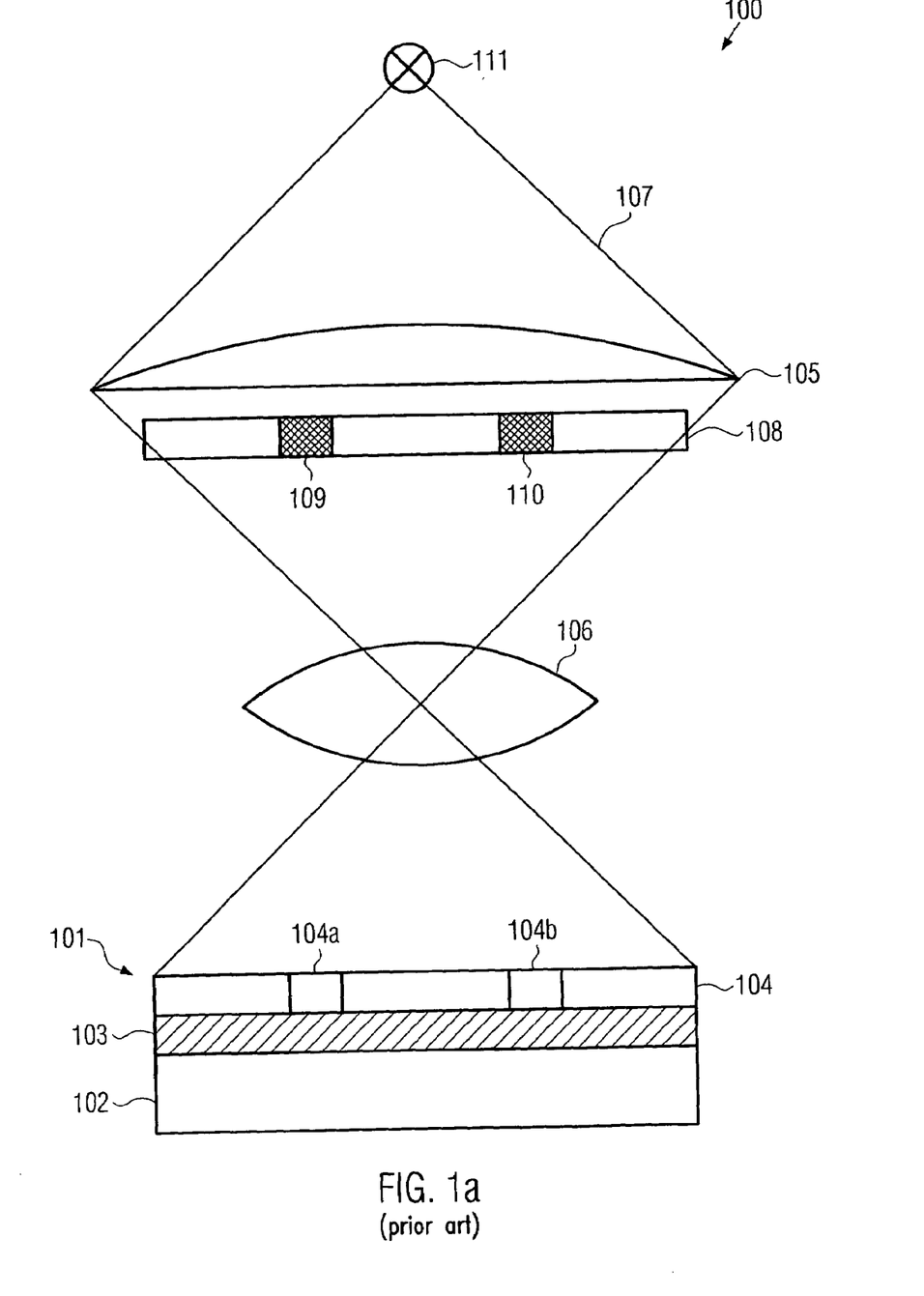
FIG. 1a shows a schematic cross-sectional view of a printer according to the state of the art.

Gate electrodes of field effect transistors can be formed by means of photolithographic and etching processes which will be described in the following with reference to FIGS. 1a–1c. FIG. 1a shows a schematic cross-sectional view of a printer 100. The printer 100 comprises a light source 111. A condenser 105 collects light 107 emitted by the light source 111 and focuses it to an objective 106. The objective 106 is adapted to image a reticle 108 to a semiconductor structure 101 provided in the printer 100. The reticle 108 comprises opaque portions 109, 110. Portions of the reticle 108 other than the opaque portions 109, 110 are permeable for the light 107.

In modem printers, the light source 111 can comprise an excimer laser adapted to emit light in the ultraviolet range of the electromagnetic spectrum. For example, the light source can comprise an argon fluoride (ArF) laser configured to emit light having a wave-length of about 193 nm. Typically, an excimer laser emits pulses of light. These pulses have durations in a range from about 5–10 nanoseconds and contain about 10 mJ of energy. The short duration of the pulses entails a large peak power of up to several MW of the pulses.

The semiconductor structure 101 comprises a substrate 102 on which a material layer 103 covered with a photoresist layer 104 is formed. The photoresist layer 104 can comprise a positive photoresist.

Figure 1B:
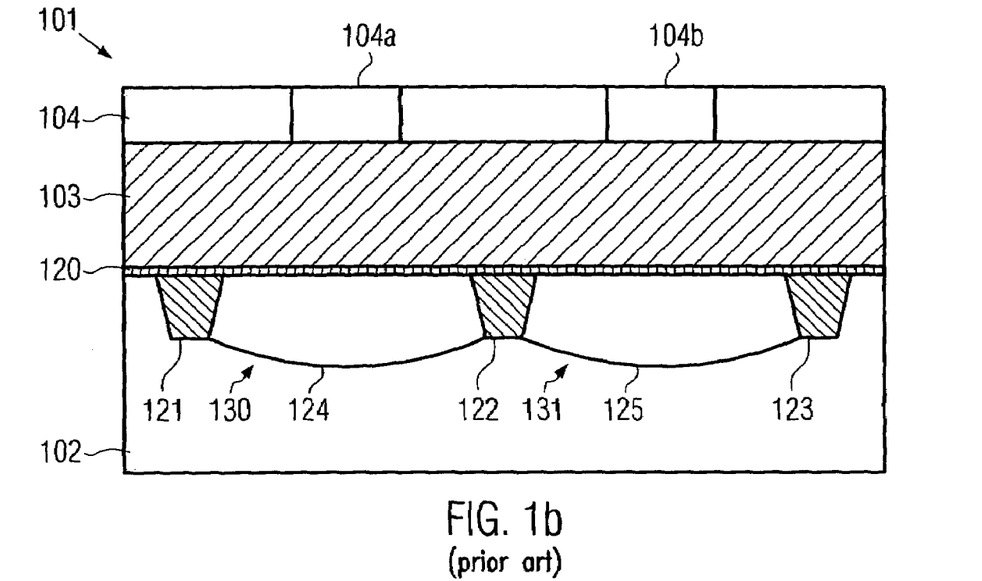
FIGS. 1b and 1c show schematic cross-sectional views of a semiconductor structure in stages of a photolithographic process according to the state of the art.

A more detailed cross-sectional view of the semiconductor structure 101 is shown in FIG. 1b. The substrate 102 comprises a first transistor element 130 and a second transistor element 131 which are separated and electrically insulated from each other by shallow trench isolations 121, 122, 123. The first transistor element 130 comprises a first active region 124. Similarly, the second transistor element 131 comprises a second active region 125. The material layer 103 and the photoresist layer 104 are formed over a gate insulation layer 120. The semiconductor structure 101 can be formed by means of methods known to persons skilled in the art comprising deposition, oxidation, ion implantation, photolithography and etching.

The photoresist layer 104 is exposed. To this end, the light source 111 is operated to emit the light 107. Thus, the reticle 108 is illuminated with the light 107. The objective 106 images the reticle 108 to the photoresist layer 104. The opaque portions 109, 110 of the reticle are imaged to regions 104a, 104b of the photoresist layer 104. Therefore, the regions 104a, 104b are substantially not irradiated with the light 107, whereas other portions of the photoresist layer 104 are irradiated with the light 107. Due to the irradiation, the photoresist in portions of the photoresist layer 104 other than the regions 104a, 104b is chemically modified.

Figure 1C:
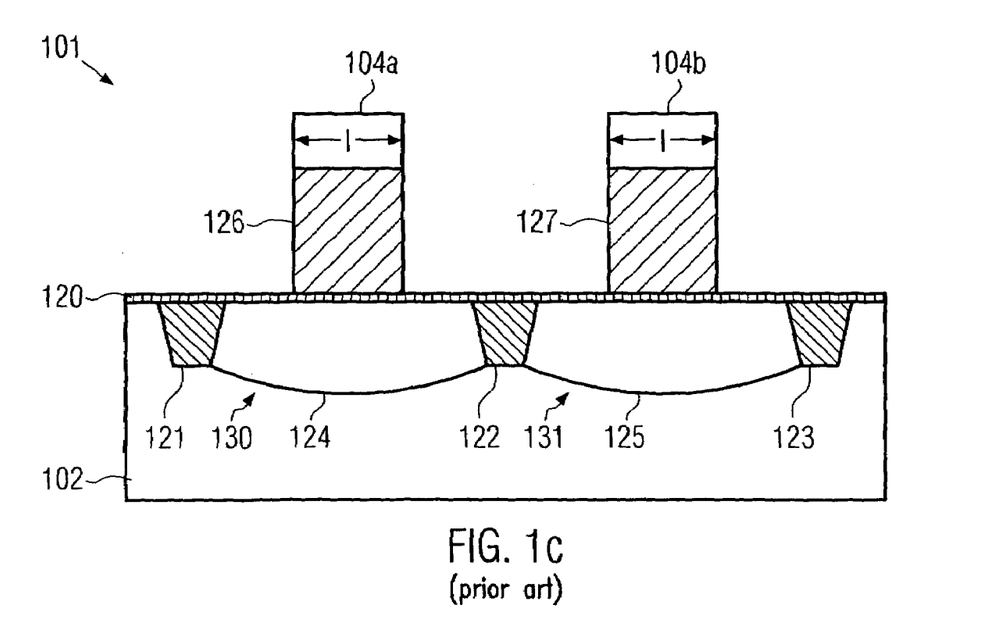

A schematic cross-sectional view of the semiconductor structure 101 in a further stage of the photolithographic process according to the state of the art is shown in FIG. 1c. After the exposure, the semiconductor structure 101 is removed from the printer 100 and the photoresist layer 104 is developed. In the development, the photoresist layer 104 is exposed to a developer. The developer can comprise a liquid adapted to dissolve those portions of the photoresist layer which were chemically modified due to the irradiation, whereas the regions 104a, 104b are substantially not affected by the developer. Therefore, the regions 104a, 104b remain on the semiconductor structure 101, whereas the rest of the photoresist layer 104 is removed.

After the development, the regions 104a, 104b have a critical dimension 1. The critical dimension 1 may be influenced by properties of the photoresist layer 104, for example contrast and sensitivity of the photoresist. Moreover, the critical dimension 1 may depend on peculiarities of the exposure, such as an amount of light received by the irradiated portions of the photoresist layer 104, which, in turn, may depend on a duration of the exposure, an intensity of the light 107 emitted by the light source 111 and an absorbance of the condenser 105 and the objective 106 for the light 107.

An anisotropic etching process is performed. To this end, the semiconductor structure 100 is exposed to an etchant adapted to selectively remove the material of the material layer 103, leaving the photoresist in the regions 104a, 104b and the material of the gate insulation layer 120 substantially intact. In anisotropic etching, an etch rate of substantially horizontal portions of the surface of the material layer 103, measured in a direction perpendicular to the surface, is significantly greater than an etch rate of inclined portions of the surface of the material layer 103. Therefore, portions of the material layer 103 under the regions 104a, 104b are substantially not affected by the etchant, whereas the rest of the material layer 103 is etched. The anisotropic etching process is stopped as soon as the gate insulation layer 120 is exposed. The portions of the material layer 103 under the regions 104a, 104b form a first gate electrode 126 and a second gate electrode 127. A length of the gate electrodes 126, 127 substantially corresponds to the critical dimension 1 of the regions 104a, 104b.

After the etching, the regions 104a, 104b of the photoresist layer 104 are removed, which can be done by means of a resist strip process known to persons skilled in the art. Thereafter, a sequence of ion implantation processes can be performed in order to introduce ions of at least one dopant material in portions of the active regions 124, 125 adjacent the gate electrodes 126, 127. Thus, source and drain regions of the transistor elements 130, 131 can be formed.

The gate electrodes 126, 127 absorb ions impinging thereon in the ion implantation processes and thus protect portions of the active regions 124, 125 from being irradiated with the ions. Consequently, substantially no dopants are introduced into portions of the active regions 124, 125 under the gate electrodes 126, 127. These portions form channel regions of the transistor elements 130, 131. A length of the channel regions depends on the length of the gate electrodes 126, 127, which, in turn, corresponds to the critical dimension 1 of the portions 104a, 104b of the photoresist layer 104. Hence, the channel length of the transistor elements 130, 131 depends on the critical dimension 1 of the regions 104a, 104b.

Since the critical dimension 1 can be influenced by various peculiarities of the exposure, such peculiarities might also affect the length of the channel regions of the transistor elements 130, 131. The channel length of a transistor element, however, may have an influence on the properties of the transistor element, as detailed above.

In order to avoid undesirable fluctuations of the properties of the transistor elements 130, 131, methods of run-to-run control can be applied. A method of run-to-run control according to the state of the art will be described in the following.

A model of the performed process is provided. The model relates a process input X and a process output Y with each other. The process input X comprises a parameter of the process which can be controlled by varying the process. For example, in the photolithographic process described above, the process input X may comprise an amount of light provided by the light source 111 in the exposure of the photoresist layer 104, which may be controlled by varying the power of the light source 111 or the time of exposure.

The process output Y comprises a quantity which characterizes a result of the process which is accessible to measurements. In the photolithographic process described above, the process output Y can comprise the critical dimension 1 of the regions 104a, 104b of the photoresist layer 104 remaining on the semiconductor structure 101 after the development. The critical dimension 1 can be measured by means of methods well known to persons skilled in the art, such as optical microscopy, electron microscopy or laser scanning.

The model is based on a linear relationship between the process input X and the process output Y and comprises a sensitivity parameter $\gamma$ and a bias parameter $b$ as expressed by the following mathematical relationship:

$$Y = \gamma X + b \qquad (1)$$

The sensitivity parameter $\gamma$ describes a variation of the process output Y caused by a variation of the process input X. The bias parameter b characterizes a portion of the process output which is substantially independent of the process input X. The sensitivity parameter $\gamma$ is determined in advance by means of methods known to persons skilled in the art and remains fixed. Variations of the process are taken into account by varying the bias parameter b.

A plurality of runs of the process is performed. In the $n^{th}$ run, a process input value X(n) is applied, wherein an index n enumerates the runs of the process. Thereafter, a process output value Y(n) of the $n^{th}$ run is measured. Then, a bias parameter value b(n+1) which is expected to occur in the next run is calculated by inserting the process input X(n) and the process output Y(n) into equation (1) and solving for the bias parameter b:

$$b(n+1) = Y(n) - \gamma X(n) \qquad (2)$$

The bias parameter value b(n+1) and the sensitivity parameter $\gamma$ are then used to calculate a process input X(n+1) which is applied in the next run by means of the following equation:

$$X(n+1) = \frac{T - b(n+1)}{\gamma} \qquad (3)$$

Here, T is a target value of the process output Y. If the method of run-to-run control is applied to the photolithographic process described above, the target value T can comprise a desired value of the critical dimension 1.

A problem of the method of run-to-run control of a photolithographic process described above is that a precision of the values of the process output Y obtained by means of the method can be insufficient for modern methods of manufacturing semiconductor structures.

In view of the above problem, there is a need for a method of run-to-run control allowing more precise control of the process output. Moreover, there is a need for a method allowing more precise control of a critical dimension of features formed in a semiconductor structure.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

According to an illustrative embodiment of the present invention, a method of run-to-run control of a manufacturing process comprises performing a plurality of runs of the manufacturing process. Each of the runs comprises applying a process input to the manufacturing process. A measured value of a process output of the respective run is determined. A process input quantity is calculated based on the measured value, the applied process input, a target value of the process output and a sensitivity parameter. The sensitivity parameter describes a variation of the process output caused by a variation of the process input. The process input applied in a subsequent one of the plurality of runs is based on the process input quantity. The sensitivity parameter is modified between at least one pair of the runs of the manufacturing process.

According to another illustrative embodiment of the present invention, a method comprises performing a plurality of runs of a manufacturing process. Each of the runs comprises providing a semiconductor structure comprising a layer of a photoresist. The semiconductor structure is exposed with an amount of light. The photoresist is developed. A critical dimension of portions of the layer of photoresist remaining on the semiconductor structure after the development of the photoresist is measured. An exposure value is calculated based on the critical dimension, the amount of light, a target value of the critical dimension and a sensitivity parameter. The sensitivity parameter describes a variation of the critical dimension caused by a variation of the amount of light. The amount of light applied in the exposure of the semiconductor structure in a subsequent one of the plurality of runs is based on the exposure value.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

The present invention is based on the realization that inaccuracies of the method of run-to-run control according to the state of the art described above can be caused by variations of a sensitivity of a process output with respect to a variation of a process input. Hence, the present invention is generally directed to methods of run-to-run control wherein a sensitivity parameter which describes a variation of a process output caused by a variation of a process input is modified between at least one pair of runs from a plurality of runs of a manufacturing process. Due to the modification of the sensitivity parameter, variations of the sensitivity can be taken into account when calculating the process input to be applied in subsequent runs.

In particular, methods of run-to-run control according to the present invention can be applied in photolithographic processes. In such embodiments, the process input can comprise an amount of light applied in the exposure of a photoresist layer formed on a semiconductor structure and the process output can comprise a critical dimension of portions of the photoresist layer remaining on the semiconductor structure after the development of the photoresist layer. The sensitivity parameter describes a variation of the critical dimension caused by a variation of the amount of light.

Further embodiments of the present invention will be described in the following. In a method according to the present invention, a plurality of runs of a manufacturing process is performed. The manufacturing process can comprise a photolithographic process. A photolithographic process performed in some embodiments of the present invention will now be described with reference to FIGS. 2a and 2b.

Figure 2A:
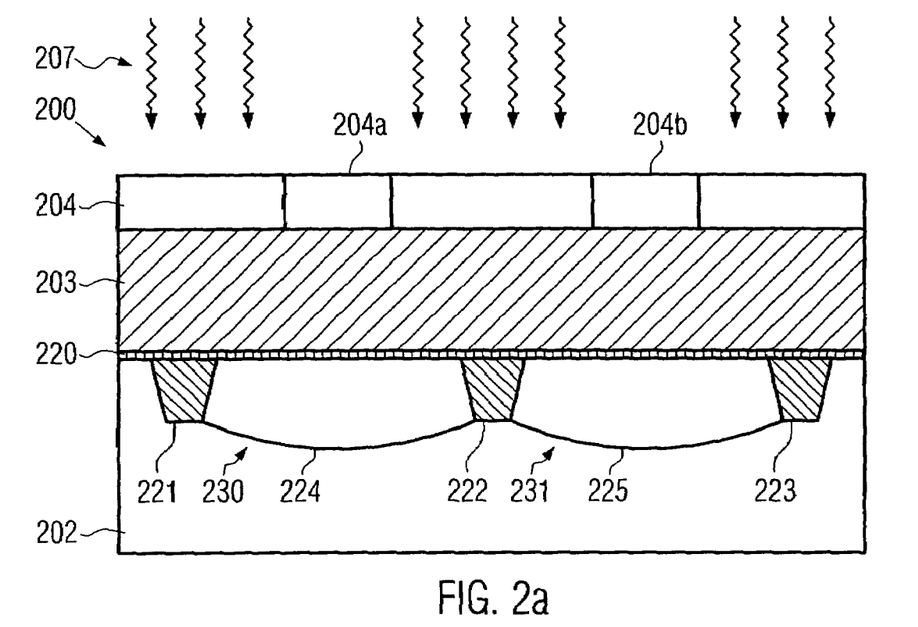
FIGS. 2a and 2b show schematic cross-sectional views of a semiconductor structure in stages of a method according to an embodiment of the present invention.

FIG. 2a shows a schematic cross-sectional view of a semiconductor structure 200 in a first stage of the photolithographic process. The semiconductor structure 200 comprises a substrate 202. In the substrate 202, a first transistor element 230 and a second transistor element 231 are formed. The first transistor element 230 and the second transistor element 231 comprise a first active region 224 and a second active region 225, respectively. Shallow trench isolations 221, 222, 223 electrically insulate the transistor elements 230, 231 from each other and from other circuit elements (not shown) in the substrate 202. The substrate 202 can be formed by means of methods known to persons skilled in the art comprising advanced techniques of oxidation, deposition, ion implantation, photolithography and etching.

A material layer 203 is formed over the substrate 202 and separated therefrom by a gate insulation layer 220. The material layer 203 may comprise polycrystalline silicon and the gate insulation layer 220 can comprise silicon dioxide. Both the gate insulation layer 220 and the material layer 203 can be formed by means of deposition techniques known to persons skilled in the art comprising chemical vapor deposition and/or plasma enhanced chemical vapor deposition.

A photoresist layer 204 which, in some embodiments of the present invention, may comprise a positive photoresist, is formed over the material layer 203. This can be done by means and methods known to persons skilled in the art comprising spin coating.

The photoresist layer 204 is exposed. To this end, portions of the photoresist layer 204 are irradiated with light 207 provided by a light source in a printer or stepper similar to the printer/stepper 100 described above with reference to FIG. 1a. Regions 204a, 204b located over the first transistor element 230 and the second transistor element 231, respectively, are substantially not irradiated with the light 207.

An amount of the light 207 is controlled. This can be done by varying a duration of the exposure or by varying an intensity of the light source in the printer. In some embodiments of the present invention, the light source can comprise an excimer laser. In such embodiments, the intensity of the light source can be varied by modifying a pulse rate of the laser or by altering a power supplied to the laser in each pulse.

Due to the irradiation with the light 207, the photoresist in portions of the photoresist layer 204 other than the regions 204a, 204b is chemically modified. Boundaries between the regions 204a, 204b and the rest of the photoresist layer 204 need not be sharp, as shown in FIG. 2a. Instead, a degree of modification of the photoresist may change continuously between the regions 204a, 204b and the rest of the photoresist layer 204. This can be caused by a limited resolution and/or depth of focus of the printer, as well as by material parameters of the photoresist such as its contrast.

Figure 2B:
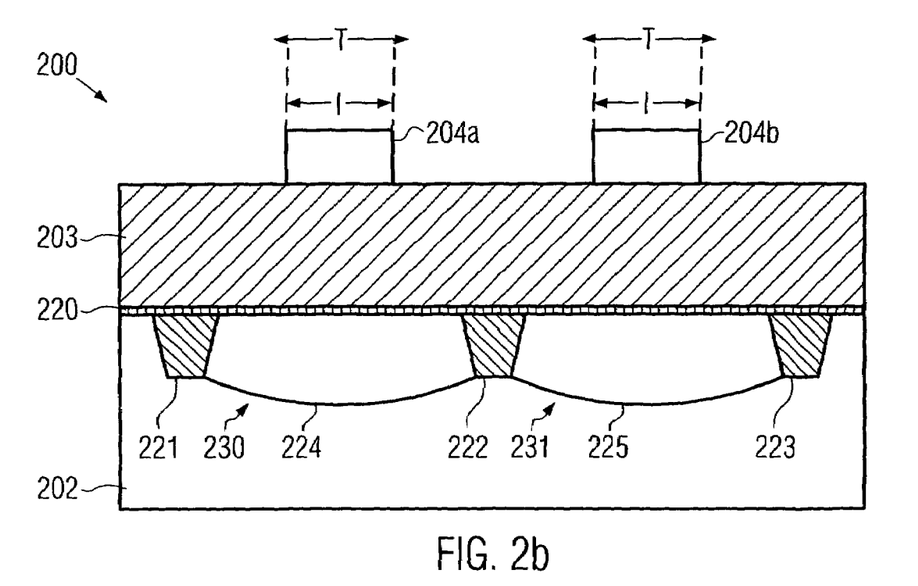

A schematic cross-sectional view of the semiconductor structure 200 in a further stage of the photolithographic process is shown in FIG. 2b. The photoresist layer 204 is developed. In the development, the semiconductor structure 200 can be exposed to a developer. The chemically modified portions of the photoresist layer 204 are dissolved in the developer and thus removed from the semiconductor structure 200. The regions 204a, 204b comprising unmodified photoresist remain on the surface of the material layer 203.

A critical dimension 1 of the regions 204a, 204b after the development of the photoresist can be influenced by the amount of the light 207 provided by the light source of the printer. Additionally, however, various other properties of the photolithographic process including a deterioration of optical elements and/or a reticle in the printer may also influence the critical dimension 1 of the regions 204a, 204b. In particular, a deterioration of the optical elements and/or the reticle may occur in embodiments of the present invention wherein the light source of the printer comprises an excimer laser adapted to emit ultraviolet light, since, due to the high peak power of the light pulses emitted by the excimer laser and the high energy of photons of the ultraviolet light, the optical elements and the reticle can be damaged in the course of time.

In order to bring the critical dimension 1 of the regions 204a, 204b of the photoresist layer 204 close to a target value T, a method of run-to-run control can be performed. A method of run-to-run control according to an embodiment of the present invention will be described in the following.

Similar to the method of run-to-run control according to the state of the art described above, a method of run-to-run control according to the present invention can comprise providing a model relating a process input X and a process output Y with each other. The process input X comprises a parameter of the process which can be controlled by varying the process. In particular, the process input X can comprise the amount of light provided in the exposure of the photoresist layer 204. The process output Y comprises a quantity characterizing a result of the process and being accessible to measurements. In particular, the process output Y may comprise the critical dimension 1 of the regions 204a, 204b of the photoresist layer 104.

The model may comprise a linear relationship between the process input X and the process output Y of the form:

$$Y=\gamma X+b \quad (4)$$

wherein $\gamma$ is a sensitivity parameter characterizing a variation of the process output Y caused by a variation of the process input X and $b$ is a bias parameter characterizing a portion of the process output Y which is substantially independent of the process input X. In the photolithographic process according to the present invention, the sensitivity parameter $\gamma$ can describe a variation of the critical dimension 1 caused by a variation of the process input X, e.g., the amount of the light 207 applied in the exposure of the photoresist layer 204. The bias parameter $b$ may describe a portion of the critical dimension 1 which is substantially independent of the process input X, e.g., the amount of the light 207.

In an $n^{th}$ one of the plurality of runs of the process, a value $X(n)$ of the process input X is applied, wherein an index n enumerates the runs of the process. In methods of run-to-run control according to the present invention, the sensitivity parameter $\gamma$ can be modified between at least one pair of the plurality of runs of the manufacturing process. The value of the sensitivity parameter $\gamma$ applied in the $n^{th}$ run will be denoted by $\gamma(n)$. Similarly, $b(n)$ denotes a value of the bias parameter $b$ used in the $n^{th}$ run.

The modification of the sensitivity parameter $\gamma$ can be based on a new determination of the sensitivity parameter $\gamma$. The sensitivity parameter y can be determined experimentally. The determination of the sensitivity parameter $\gamma$ can comprise providing a plurality of test structures. Each of the test structures comprises a photoresist layer similar to the photoresist layer 204 of the semiconductor structure 200. The photoresist layers of the test structures are exposed through a reticle. Thus, regions of the photoresist layer are substantially not irradiated with light. An amount of light provided in the exposure is varied between the test structures. After the exposure, the photoresist layers are developed to remove irradiated portions of the photoresist layers and a critical dimension of regions of the photoresist remaining on the test structures is measured by means of methods known to persons skilled in the art. Then, the critical dimension of the remaining regions of the photoresist layer is related to the amount of light provided in the exposure in order to obtain a value of the sensitivity parameter $\gamma$. This can be done by means of a linear regression well known to persons skilled in the art. If the determination of the sensitivity parameter γ is performed between the $n^{th}$ and the $(n+1)^{th}$ run of the manufacturing process, the modification of the sensitivity parameter γ can be performed by setting the value y(n+1) of the sensitivity parameter γ applied in the $(n+1)^{th}$ run to the newly determined value. In each run of the manufacturing process, a process input X(n) is applied and measured value Y(n) of the process output Y is determined.

In embodiments of the present invention wherein the manufacturing process comprises a photolithographic process and the process output Y comprises a critical dimension of the regions 204a, 204b of the photoresist layer 204, the measurement of the process output Y can comprise an inspection of the semiconductor structure 200 after the development of the photoresist. The inspection of the semiconductor structure 200 can be performed by means of methods of optical microscopy, electron microscopy or laser scanning known to persons skilled in the art.

A process input quantity x(n+1) is calculated based on the measured value Y(n), the target value T of the process output and at least one value of the sensitivity parameter γ.

Figure 3:
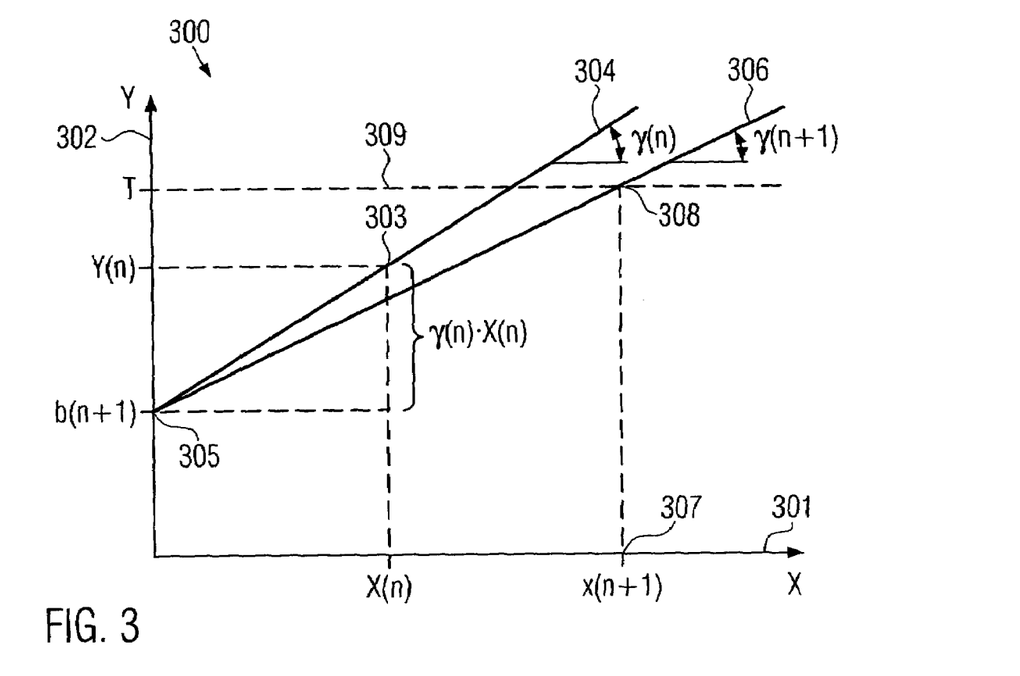
FIG. 3 shows a diagram illustrating calculations performed in a method according to an embodiment of the present invention.

The calculation of the process input quantity x(n+1) according to one embodiment of the present invention will be described with reference to FIG. 3. FIG. 3 shows a diagram 300 comprising a first coordinate axis 301 and a second coordinate axis 302. The first coordinate axis 301 represents values of the process input X and the second coordinate axis 302 represents values of the process output Y. A point 303 corresponds to the value X(n) of the process input applied in the $n^{th}$ run of the manufacturing process and the measured value Y(n) of the process output Y determined in the $n^{th}$ run.

A bias parameter value b(n+1) to be used in the subsequent $(n+1)^{th}$ run of the manufacturing process can be calculated in accordance with the following equation:

$$b(n+1) = Y(n) - \gamma(n)X(n) \quad (5)$$

The bias parameter value b(n+1) corresponds to an intersection 305 between the second coordinate axis 302 and a straight line 304 having a slope corresponding to the sensitivity parameter value γ(n) and running through the point 303.

The process input quantity x(n+1) can be calculated based on the bias parameter value b(n+1), the target value T of the process output Y and the value y(n+1) of the sensitivity parameter γ applied in the next step in accordance with the following equation:

$$x(n+1) = \frac{T - b(n+1)}{\gamma(n+1)} \quad (6)$$

The process input quantity x(n+1) corresponds to a projection 307 of an intersection 308 between a straight line 306 and a horizontal line 309 corresponding to the target value T to the first coordinate axis 301. The straight line 306 has a slope corresponding to the sensitivity parameter value γ(n+1) and runs through the intersection 305.

An error Δx(n+1) of the process input quantity x(n+1) can be calculated by means of the calculus of errors well known to persons skilled in the art. According to the law of error propagation, one obtains:

$$\Delta x(n+1) = \left| \frac{X(n)}{\gamma(n+1)} \right| \Delta \gamma(n) + \left| \frac{T - b(n+1)}{\gamma(n+1)^2} \right| \Delta \gamma(n+1) \quad (7)$$

wherein Δγ(n) denotes an error of the sensitivity parameter value γ(n) and Δγ(n+1) denotes an error of the sensitivity parameter value γ(n+1). Errors of the sensitivity parameter values γ(n), γ(n+1) may comprise a deviation between the sensitivity parameter values γ(n), γ(n+1) and a true value $\gamma_R$ of the sensitivity parameter γ which optimally describes the manufacturing process under consideration. The errors Δγ(n), Δγ(n+1) can be caused by variations of the manufacturing process having occurred since the determination of the respective sensitivity parameter value as well as by errors of the determination of the sensitivity parameter values γ(n), γ(n+1).

If a modification of the sensitivity parameter γ based on a new determination of the sensitivity parameter has been performed between the $n^{th}$ and the $(n+1)^{th}$ run of the manufacturing process, the error Δγ(n+1) of the new value γ(n+1) can be much smaller than the error Δγ(n) of the old value γ(n). Hence, the error Δγ(n+1) can be neglected and one obtains:

$$\Delta x(n+1) \approx \left| \frac{X(n)}{\gamma(n+1)} \right| \Delta \gamma(n) \quad (8)$$

Consequently, shortly after the modification of the sensitivity parameter γ, the error Δx(n+1) is approximately proportional to an absolute value of the process input X(n).

A process input value X(n+1) applied in a subsequent one of the plurality of runs is based on the process input quantity x(n+1).

The process input value X(n+1) applied in the subsequent run can be identical to the process input quantity x(n+1). In other embodiments of the present invention, the process input value X(n+1) comprises a weighted average of the process input quantity x(n+1) and the process input value X(n) applied in the accomplished run. In such embodiments, the process input value X(n+1) can be calculated in accordance with the following equation:

$$X(n+1) = \lambda X(n) + (1-\lambda)x(n+1) \quad (9)$$

A weighting parameter λ can assume values between zero and one. For λ=1, the process input X(n+1) is identical to the process input X(n) applied in the accomplished run. For λ=0, the process input X(n+1) applied in the subsequent run is identical to the process input value x(n+1). For intermediate values of λ, the process input X(n+1) is determined both by the process input X(n) and the process input value x(n+1), smaller values of λ corresponding to a greater contribution of the process input value x(n+1).

A greater contribution of the process input quantity x(n+1) which has been determined on the basis of the accomplished run of the manufacturing process can allow the method of run-to-run control to more quickly react to variations of the manufacturing process. Conversely, a smaller contribution of the process input value x(n+1) may improve a stability of the method of run-to-run control with respect to errors of the process input value x(n+1).

Figure 4:
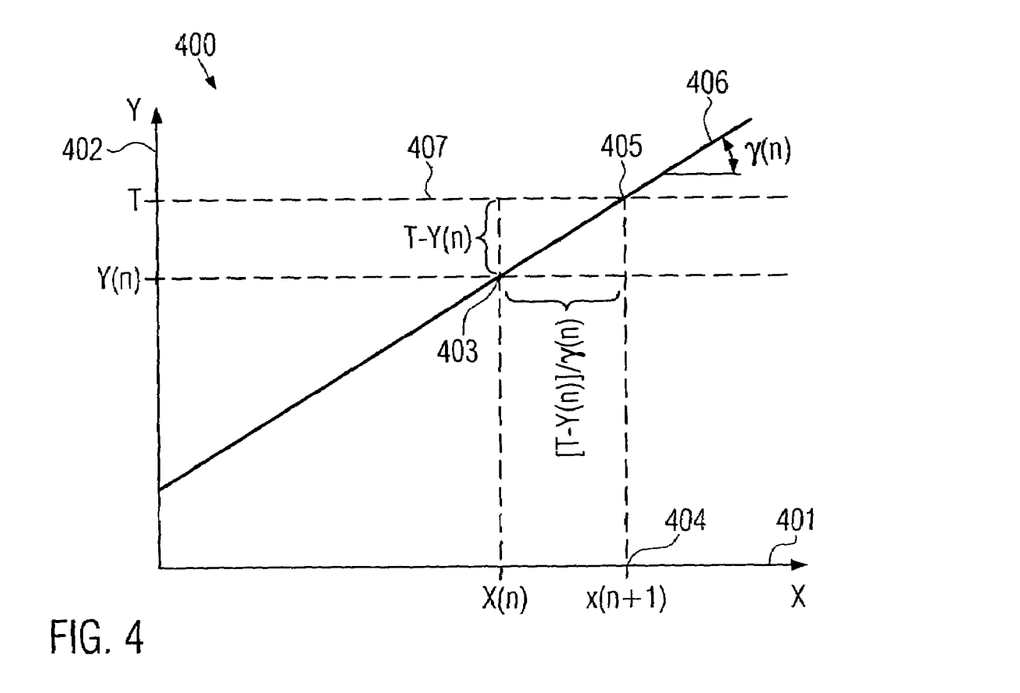
FIG. 4 shows a diagram illustrating calculations performed in a method according to another embodiment of the present invention.

The calculation of the process input according to another embodiment of the present invention will be described with respect to FIG. 4. A diagram 400 comprises a first coordinate axis 401 and a second coordinate axis 402. The first coordinate axis 401 denotes values of the process input X and the second coordinate axis 402 denotes values of the process output Y. A point 403 corresponds to the process input value X(n) applied in the $n^{th}$ run of the manufacturing process and the measured value Y(n) of the process output Y determined in the $n^{th}$ run.

The process input quantity x(n+1) can be calculated based on the process input value X(n), the measured value Y(n) of the process output Y, the target value T and the value γ(n) of the sensitivity parameter γ in accordance with the following equation:

$$x(n+1) = X(n) + \frac{T-Y(n)}{\gamma(n)} \quad (10)$$

The process input quantity x(n+1) corresponds to a projection 404 of an intersection 405 of a straight line 406 and a horizontal line 407 corresponding to the target value T to the first coordinate axis 401. The straight line 406 runs through the point 403 and has a slope corresponding to the value γ(n) of the sensitivity parameter γ.

The calculation of the process input quantity x(n+1) according to equation (10) comprises an addition of a correction value $X_{corr}$=[T−Y(n)]/γ(n) to the process input value X(n). The correction value $X_{corr}$ comprises a ratio between a difference T−Y(n) between the target value T and the measured value Y(n) of the process output Y and the sensitivity parameter value γ(n).

An error Δx(n+1) of the process input quantity x(n+1) can be calculated by means of the calculus of errors. Using the law of error propagation well known to persons skilled in the art one obtains:

$$\Delta x(n+1) = \left|\frac{T-Y(n)}{\gamma(n)}\right| \Delta \gamma(n) \quad (11)$$

A comparison between equations (11) and (10) shows that the error Δx(n+1) is proportional to the absolute value of the correction value $X_{corr}$ added to the process input value X(n). Since the correction value $X_{corr}$ can be considerably smaller than the process input value X(n), the error Δx(n+1) can be smaller than in the embodiment described above with reference to FIG. 3 wherein, even immediately after a modification of the sensitivity parameter γ based on a new determination of the sensitivity parameter γ, the error Δx(n+1) is proportional to the process input X(n). Hence, a precision of the method of run-to-run control can advantageously be increased and a robustness of the method of run-to-run control may be improved.

In further embodiments of the present invention, in the calculation of the process input quantity x(n+1), the value γ(n+1) of the sensitivity parameter γ may be used instead of the value γ(n). Hence, the process input quantity x(n+1) can be calculated in accordance with the following equation:

$$x(n+1) = X(n) + \frac{T-Y(n)}{\gamma(n+1)} \quad (12)$$

The calculation of the process input quantity x(n+1) according to equation (10) comprises an addition of a correction value $X_{corr}$=[T−Y(n)]/γ(n+1) to the process input value X(n). The correction value $X_{corr}$ comprises a ratio between a difference T−Y(n) between the target value T and the measured value Y(n) of the process output Y and the sensitivity parameter value γ(n+1).

Since after the determination of the sensitivity parameter γ, the newly determined value γ(n+1) is likely to be more precise than the former value γ(n), calculating the process input quantity x(n+1) in accordance with equation (12) allows a further reduction of errors of the process input quantity x(n+1).

Similar to the embodiment of the present invention described above with reference to FIG. 3, the process input X(n+1) applied in the subsequent run of the manufacturing process can be calculated based on the process input quantity x(n+1). The process input X(n+1) can be identical to the process input quantity x(n+1) or may comprise a weighted average of the process input quantity x(n+1) and the process input X(n) applied in the accomplished $n^{th}$ run of the manufacturing process.

In embodiments of the present invention wherein the manufacturing process comprises the photolithographic process described above, after the development of the photoresist layer 204, gate electrodes similar to the gate electrodes 126, 127 formed in the photolithographic process according to the state of the art may be formed by means of an anisotropic etching process. Additionally, the manufacturing process may comprise performance of one or more ion implantation processes in order to form source and drain regions of the first transistor element 130 and the second transistor element 131. In the ion implantation, the gate electrodes and/or sidewall spacers formed adjacent the gate electrodes may serve as implantation masks protecting the active regions 124, 125 from being irradiated with ions. Hence, a length of channel regions of the first transistor element 130 and the second transistor element 131 is determined by the length of the gate electrodes which in turn is determined by the critical dimension 1 of the regions 104a, 104b of the photoresist layer 104.

Due to the application of the method of run-to-run control described above, the present invention allows more precise control of the critical dimension 1 and, consequently, more precise control of the channel length of the transistor elements 130, 131. Hence, performance of the transistor elements 130, 131 may be improved.

In some embodiments of the present invention, in each run of the manufacturing process, a single semiconductor structure 200 can be processed. In other embodiments, the manufacturing process can be performed lot-wise. In each run, a plurality of semiconductors similar to the semiconductor structure 200 is processed.

In such embodiments, a same value X(n) of the process input X can be applied in the processing of all the semiconductor structures in a lot. The determination of the measured value Y(n) of the process output Y can comprise an averaging of measured values of the process output Y determined from at least two of the semiconductor structures in the lot. In some embodiments, the measured value Y(n) can comprise measured values determined from all the semiconductor structures in the lot. In further embodiments, the measured value Y(n) can be determined from a single semiconductor structure of the lot.

The present invention is not restricted to photolithographic processes performed in the manufacturing of semiconductor structures. Instead, the present invention may be applied in the control of a large variety of processes known to persons skilled in the art.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method of run-to-run control of a manufacturing process, comprising:
   performing a plurality of runs of said manufacturing process, each of said runs comprising:
      applying a value of a process input to said manufacturing process;
      determining a measured value of a process output of the respective run; and
      calculating a process input quantity based on said measured value, said applied value of said process input, a target value of said process output, at least one value of a bias parameter, and at least one value of a sensitivity parameter, wherein said sensitivity parameter describes a variation of said process output caused by a variation of said process input and wherein the value of the process input applied in a subsequent one of said plurality of runs is based on said process input quantity;
   wherein said bias parameter is modified between each pair of sequential runs of said manufacturing process and said sensitivity parameter is modified between at least one pair of said runs of said manufacturing process.

2. The method of claim 1, wherein said calculation of said process input quantity comprises adding a correction value to said value of said process input.

3. The method of claim 2, wherein said correction value comprises a ratio between a difference between said target value and said measured value and a value of said sensitivity parameter.

4. The method of claim 1, wherein said process input applied in said subsequent one of said plurality of runs comprises a weighted average of said process input quantity and said process input.

5. The method of claim 1, wherein said sensitivity parameter is modified based on results of at least one test run of said manufacturing process.

6. The method of claim 1, wherein said process input comprises an amount of light applied in an exposure of a layer of a photoresist formed on a semiconductor structure.

7. The method of claim 6, wherein said process output comprises a critical dimension of portions of said layer of photoresist remaining on said semiconductor structure after a development of said photoresist.

8. The method of claim 7, wherein said determination of said measured value of said process output comprises an inspection of said semiconductor structure after said development of said photoresist.

9. The method of claim 8, wherein said inspection of said semiconductor structure comprises at least one of optical microscopy, electron microscopy and laser scanning.

10. A method, comprising performing a plurality of runs of a manufacturing process, each of said runs comprising:
   providing a semiconductor structure comprising a layer of a photoresist;
   exposing said semiconductor structure with an amount of light;
   developing said photoresist to define a plurality of photoresist features;
   measuring a critical dimension of at least one of said photoresist features remaining on said semiconductor structure after said development of said photoresist; and
   calculating an exposure value based on said critical dimension, said amount of light, a target value of said critical dimension, at least one value of a bias parameter, and at least one value of a sensitivity parameter, wherein said sensitivity parameter describes a variation of said critical dimension caused by a variation of said amount of light and wherein the amount of light applied in the exposure of the semiconductor structure in a subsequent one of said plurality of runs is based on said exposure value;
   wherein said bias parameter is modified between each pair of sequential runs of said manufacturing process and said sensitivity parameter is modified between at least one pair of said runs of said manufacturing process.

11. The method of claim 10, wherein said calculation of said exposure value comprises adding a correction value to said amount of light.

12. The method of claim 11, wherein said correction value comprises a ratio between a difference between said target value and said critical dimension and said sensitivity parameter.

13. The method of claim 10, wherein said amount of light applied in the exposure of the semiconductor structure in the subsequent one of the plurality of runs comprises a weighted average of said exposure value and said amount of light.

14. The method of claim 10, wherein said sensitivity parameter is modified based on results of at least one test run of said manufacturing process.

15. The method of claim 10, wherein said measurement of said critical dimension comprises an inspection of said semiconductor structure.

16. The method of claim 15, wherein said inspection of said semiconductor structure comprises at least one of optical microscopy, electron microscopy and laser scanning.

* * * * *